UNITED STATES PATENT OFFICE.

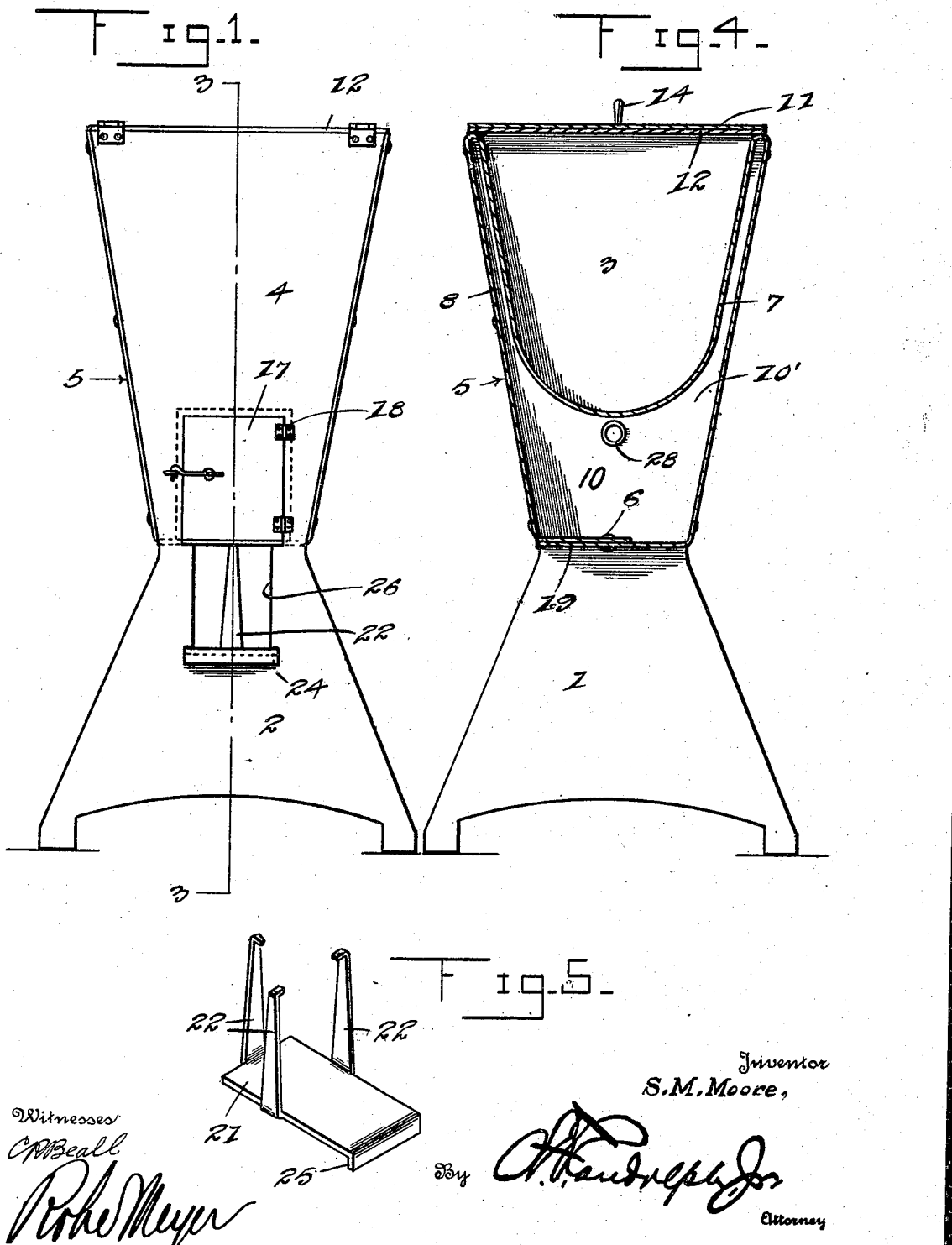

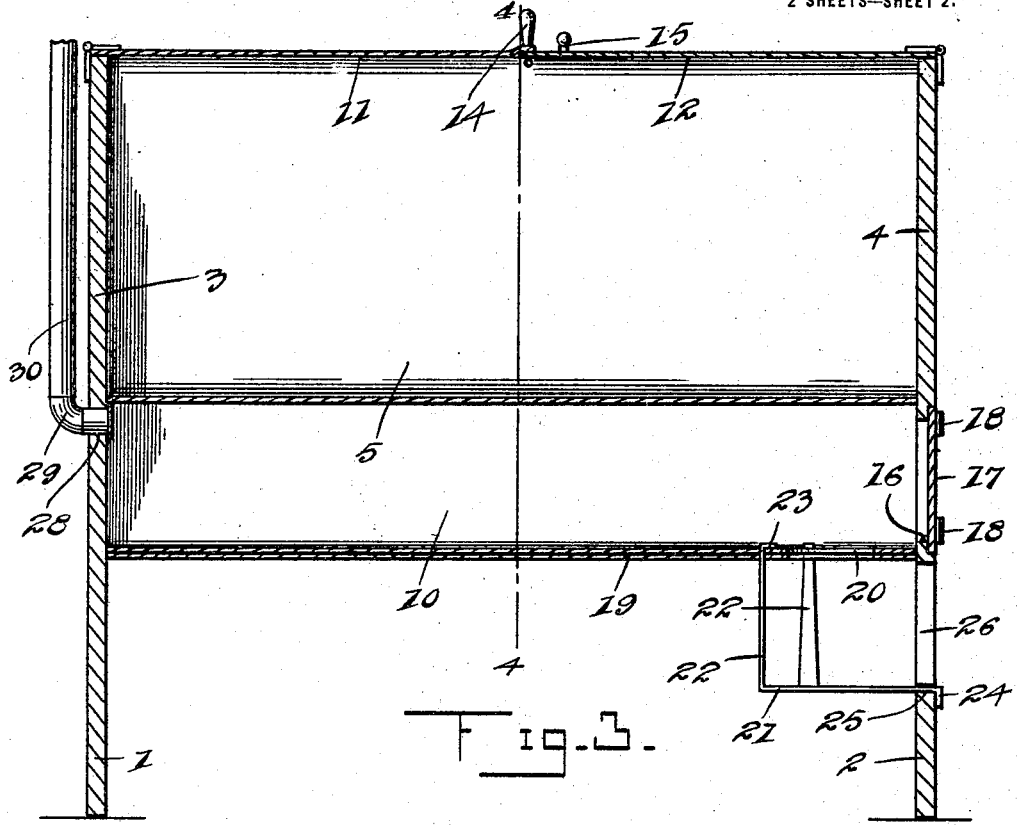
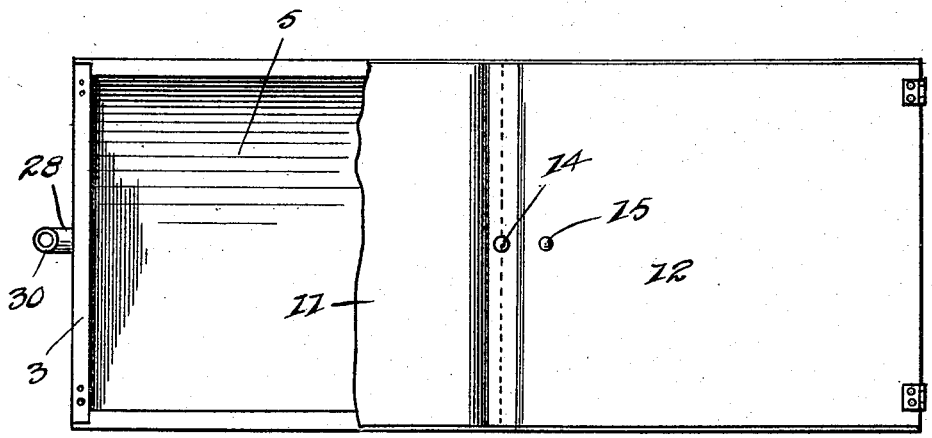

SAMUEL M. MOORE, OF SUMNER, ILLINOIS.

DOUGH-RAISER.

1,188,471.  Specification of Letters Patent.  Patented June 27, 1916.

Application filed March 26, 1914. Serial No. 827,326.

*To all whom it may concern:*

Be it known that I, SAMUEL M. MOORE, citizen of the United States, residing at Sumner, in the county of Lawrence and State of Illinois, have invented certain new and useful Improvements in Dough-Raisers; and I do hereby declare the following to be a full, clear, and exact description of the invention, such as will enable others skilled in the art to which it appertains to make and use the same.

This invention relates to dough raisers, and has as its primary object the provision of a retaining receptacle for the dough during the raising of same prior to kneading into loaves for baking, which receptacle has a compartment positioned therebelow for the circulation of heated air for facilitating the raising of the dough.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is an end view of the improved dough raiser. Fig. 2 is a top plan view, showing a section broken away, Fig. 3 is a central sectional view of the line 3—3 of Fig. 1, Fig. 4 is a cross-sectional view of the line 4—4 of Fig. 3, and Fig. 5 is a detailed perspective view of a part of the dough raiser.

Referring more particularly to the drawings, 1 and 2 designate the supporting legs of the dough raiser, which legs are substantially frusto triangular, having the ends 3 and 4 of the body 5 formed integrally therewith. The body 5 is provided with a dough receptacle 7, which is substantially U-shaped in cross section. The dough receptacle 7 is supported from the upper edges of the sides 8 of the body 5. The lower portions of the sides 8 are bent inwardly and overlapped to provide the bottom 19 of the body 5. The dough receptacle 7, sides 9 and the bottom 19, are formed of a single blank of metal, rivets 6 pass through the overlapped portions of the bottom 19 to secure the side and bottom of the blank in receptacle, forming position. The ends 3 and 4 are secured to the sides 8 and bottom 19 in any suitable manner. The side walls of the dough receptacle 7 are spaced from the sides 8 and the bottom wall of the receptacle is spaced from the bottom 19 to provide a chamber 10. The end edges of the receptacle 7 and the end edges of the sides 8 abut the inner faces of the ends 3 and 4, as is clearly shown in Figs. 3 and 4 of the drawings, so as to permit of the circulation of heated air about the exterior of the receptacle 7, for provision of the proper temperature to facilitate the raising of dough within the receptacle 7.

The end pieces 3 and 4, have doors or covers 11 and 12 hingedly connected thereto, which covers form a closure for the upper open end of the dough receptacle 7, and have their inner terminal edges overlapping, in the center of the receptacle with any suitable type of fastening 14 applied for holding the covers 11 and 12 connected when they are positioned for forming a closure for the upper open end of the dough receptacle 7. The handle 15 is connected to the door 12, for facilitating the opening and closing thereof, while the hand grip forms the handle for facilitating the opening or closing of the door 11.

The end piece 4 is formed with a cut out portion 16, which cut out portion has a door 17 hingedly forming a closure therefor, which door is hingedly connected, as at 18, to the outer surface of the end piece 4, and provides means for access to the interior of the heated air circulating chamber 10. The bottom 19, of the air compartment 10, is formed with an opening 20, adjacent the end piece 4 of the body 5, which opening has positioned directly therebelow a platform 21, which platform is provided for the purpose of supporting any suitable type of heat radiating means for heating the air within the chamber 10, to raise the temperature thereto the proper thermal degree for facilitating the raising of the dough within the dough receptacle 7.

The platform 21 has supporting arms 22 formed thereupon, which arms extend upwardly from the platform and are inserted through the openings in the bottom 19, the upper terminal ends of the arms 22 being bent at right angles to the arms proper and resting upon the inner surface of the bottom 19 of the chamber 10, as clearly shown at 23 in Fig. 3 of the drawings, for supporting the platform in extended position beneath the chamber 10. The end 24 of the platform 21 rests upon the edges 25 of the supporting legs 2, which edge is formed by the lower termination of the opening 26 formed in the supporting leg, which opening is provided for the mounting of any suitable type of heat generating means (not shown upon the drawings).

The end 3 of one of the supporting legs is provided with an opening 28 extending therethrough, in which opening is seated an elbow 29, which elbow has connected to its outer end a length of pipe 30, for providing an outlet for the air from the chamber 10 to insure the proper circulation of air in the said chamber.

In the using or practical application of the improved dough raiser, the covers or doors 11 and 12 are open, and the dough is placed within the dough receptacle 7, after which the heat generating apparatus is ignited and the heat from the heat generating means will pass upwardly through the opening 20, heating the air within the chamber 10, which will be properly circulated within the chamber about the exterior of the walls of the dough receptacle 7, and heat the walls of the dough receptacle to a certain extent for facilitating the proper raising of the dough.

In reducing the invention to practice such minor features of construction, combination and arrangement of parts may necessitate alterations to which the patentee is entitled provided the alterations are comprehended within the scope of what is claimed.

What is claimed is:—

1. A dough receptacle of the class described comprising a body, the upper edges of the sides of the body are bent inwardly to form a receptacle, the lower edges or ends of the sides are bent inwardly forming a bottom, the sides of the receptacle, the bottom of the recepatcle and the bottom of the body are spaced apart, supporting legs substantially frustro triangular in shape are secured to opposite ends of the body, said legs being formed of a single piece and said body and receptacle formed of a single piece, a heat generator supporting platform suspended below and connected to the bottom of the body communicating with the compartment between the bottom of the receptacle and the bottom of the body, and hinged closures secured to oposite legs for closing the open end portion of the receptacle.

2. A dough raiser of the class described comprising a body, a dough receptacle supported from the upper edges of the sides of the body, supporting legs secured in opposite ends of the body and receptacle, the lower portions of the sides of the body being bent inwardly and overlapped to provide a bottom for the body, means for securing the overlapped ends together, the side walls of the receptacle spaced from the sides of the body, the bottom wall of the receptacle spaced from the bottom of the body providing an air chamber between the receptacle and bottom of the body, and means hingedly secured to the end supporting legs for covering said receptacle, a heat generator supporting platform suspended below said chamber for circulating heat into the air chamber, and means communicating with said chamber to allow the escapement of said heat.

In testimony whereof I affix my signature in presence of two witnesses.

SAMUEL M. MOORE.

Witnesses:
W. A. HIGGINS,
W. H. HAZELTON.

Copies of this patent may be obtained for five cents each, by addressing the "Commissioner of Patents, Washington, D. C."